July 31, 1962  J. P. GLASS  3,047,766
ELECTRONIC HEADING-SENSING DEVICE
Filed Jan. 21, 1960  3 Sheets-Sheet 1

INVENTOR.
JOHN P. GLASS
BY John F. A. Earley, Jr.
ATTORNEY

July 31, 1962  J. P. GLASS  3,047,766
ELECTRONIC HEADING-SENSING DEVICE
Filed Jan. 21, 1960  3 Sheets-Sheet 2

INVENTOR.
JOHN P. GLASS
BY
John F. A. Earley Jr.
ATTORNEY

INVENTOR.
JOHN P. GLASS

United States Patent Office 3,047,766
Patented July 31, 1962

3,047,766
ELECTRONIC HEADING-SENSING DEVICE
John P. Glass, 718 Lorraine Ave., Ardmore, Pa.
Filed Jan. 21, 1960, Ser. No. 3,913
21 Claims. (Cl. 315—21)

This invention relates to improvements in heading-sensing devices, and more particularly concerns electronic heading-sensing devices which utilize a vibrating reed to provide an indication of the deviation of an aircraft from a predetermined direction.

It has heretofore been proposed to provide gyroscopic devices having rotating elements in order to ascertain the deviation from a given direction of a moving vessel or aircraft. However, the rotating elements of such devices must be made with great precision and must be handled very carefully since they are of extreme delicacy and are likely to become deranged by shock, vibration, impact, or by variation in temperature. In some cases, inaccuracies caused by, for example, variations in temperature are compensated for by further complex equipment which only adds to the complexity, expense, and difficulty of maintaining the apparatus.

Another disadvantage of gyroscopic devices is that a motor is needed to drive the rotating elements of gyroscope, and such motor adds bulk and weight to the apparatus. This is undesirable in many applications such as in the control for an automatic pilot of an aircraft.

Other indicating devices have been proposed which are of low sensitivity and which require complex electronic equipment such as amplifiers or oscillators to convert a weak signal to a useful one. The equipment required is bulky, expensive and heavy, and is difficult to maintain.

Accordingly, it is an object of this invention to overcome the aforementioned problems and difficulties, and to provide a heading-sensing device which is compact, light in weight, and extremely sensitive.

It is another object of this invention to provide a heading-sensing device which is manufactured on a mass production basis at relatively low cost.

It is another object of this invention to provide a heading-sensing device which is easily maintained and which is relatively unaffected by vibration, shock, impact, or temperature variation.

It is another object of this invention to provide a heading-sensing device which does not require complex and expensive auxiliary equipment such as oscillators or amplifiers to provide an electrical signal of sufficient strength as to be useful.

A heading-sensing device similar to the one herein described is disclosed in U.S. Patent No. 2,895,048, which issued on July 14, 1959, to Irvin S. Jacobsen. The Jacobsen device is satisfactory for its intended use, but the invention herein described is an improvement that gives better sensitivity, longer memory, control of the amplitude of vibration of the vibrating reed, control of the rate of erection of the vibrating reed, and eliminates any undesired mechanically and electrically preferred plane of vibration of the vibrating reed.

Other objects and advantages of this invention, including its simplicity and economy, as well as the ease with which it may be adapted to existing equipment, will further become apparent hereinafter and in the drawings, in which.

Figure 1:
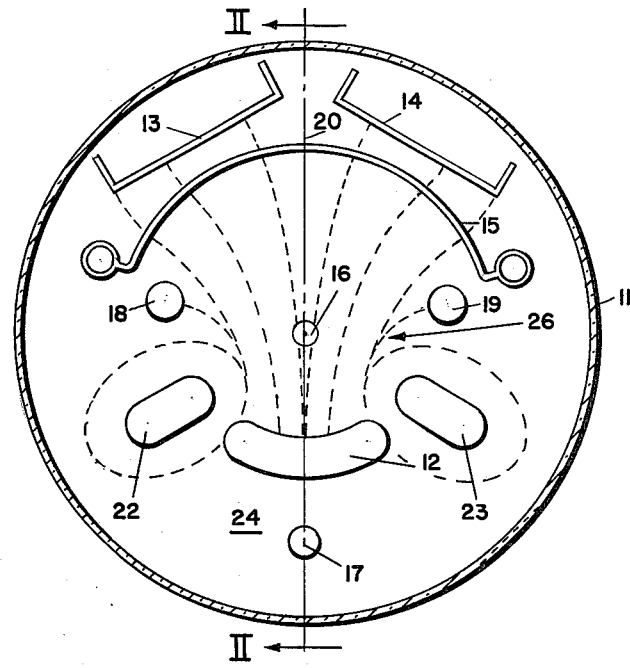
FIG. 1 is a view in top plan of a heading-sensing device constructed in accordance with this invention.
Figure 2:
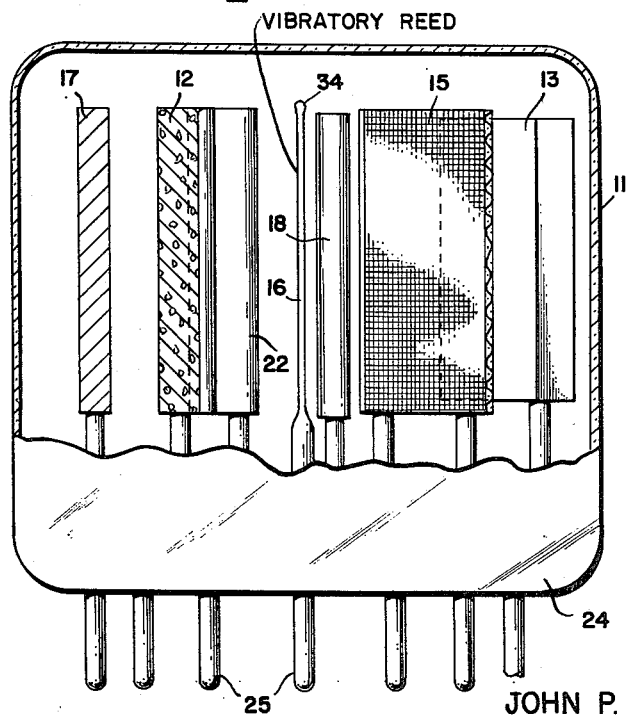
FIG. 2 is a view in section of the heading-sensing device shown in FIG. 1 taken as indicated by the lines and arrows II—II which appear in FIG. 1.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown an electronic heading-sensing device which includes an evacuated envelope 11 having positioned therein an electronic emitting member 12, two electron collecting members 13, 14 which are polarized in a positive sense, a drive member 15 which is opposed to the emitting member 12, a vibratory reed 16 which is polarized in the negative sense and which is in the path of the electrons between emitting member 12 and collecting members 13, 14, and a self-biasing amplitude control anode 17 for controlling the maximum amplitude of vibration of vibratory reed 16.

Also provided are a pair of adjustably polarized electron-beam forming members 18, 19 (shown as being positively polarized in the drawings, FIG. 7), and a pair of polarized electron-beam directing members 22, 23.

Evacuated envelope 11 is formed of an impervious material, preferably steel or glass, and includes an insulating base 24 in which the members within envelope 11 are mounted. Also mounted in base 24 but extending outwardly from envelope 11 are pins 25 which are electrically connected to the members within envelope 11 in a conventional manner (for example, see U.S. Patent No. 2,895,-048 to Jacobsen). Envelope 11 is evacuated in the manner of a conventional vacuum tube.

Electron collecting members 13, 14 are symmetrically positioned on each side of a vertical line 20 passing through vibrating reed 16 as shown in FIG. 1.

Drive member 15 is formed of screen material and is curved in an arc around vibratory reed 16 in such a way as to provide a substantial arc electrostatically to avoid creating a preferred plane of vibration for vibratory reed 16, and to shield vibratory reed 16 from the effect of divided collecting members 13, 14 to effectively screen the vibratory reed 16 electrostatically therefrom.

The pair of negatively polarized electron-beam directing members 22, 23 are symmetrically arranged on each side of the vertical line 20 passing through vibratory reed 16 in FIG. 1. The charges on beam directing members 22, 23 may be varied so as to increase or decrease the size of the channel 26 of electrons flowing toward drive member 15.

Channel 26 is indicated in FIG. 1 in dotted lines. By increasing the value of one of the beam directing members 22, 23, and decreasing the value of the other beam directing member, channel 26 may be shifted sideways so as to be properly centered.

Beam forming members 18, 19 are positioned substantially symmetrically on each side of vertical line 20 (FIG. 1). The values of beam forming members 18, 19 ("values" meaning geometrical position, size, and electrical bias) may be varied to assure that the stream of electrons in channel 26 is uniform so as to eliminate any undesired, electronically created, preferred plane of vibration. In addition, the values of beam forming members 18, 19 may be varied to increase or decrease the amount of electron flow.

The values of electron-beam forming members 18, 19 may be varied, if desired, to create a slightly preferred plane of vibration. By controlling the strength of this preferred plane of vibration, the sensitivity of the heading-sensing is controlled. For example, if vibratory reed 16 is vibrating along the vertical line 20 drawn through it in FIG. 1, and the envelope 11 is suddenly rotated counter-clockwise, the plane of vibration of the reed 16 does not change. This means that the reed 16 is now vibrating closer to electron collecting member 14. As vibratory reed 16 continues to vibrate it gradually returns to the preferred plane of vibration which lies half-way between collecting members 13, 14. The rate at which the vibratory reed 16 returns to the preferred plane of vibration is known as its erection rate. The slower the return to the preferred plane of vibration, the better the sensitivity of the instrument as a rate device, and the longer its memory as a position device. This erection rate may be controlled by adjusting the bias and impedance to beam forming members 18, 19. When the effect of beam forming members 18, 19 is low, the erection rate is slow, and when the effect of beam forming members 18, 19 is high, the erection rate is correspondingly high. If it is desired to decrease the lateral stability of the reed 16, inductive loads are connected in circuit with members 18, 19.

In the Jacobsen device, there is no control of the amplitude of vibration of vibratory reed 16. In order that the device have sufficient gain to start vibration of vibratory reed 16, the Jacobsen circuit is such that the vibratory reed 16 quickly builds up excessive amplitude, and strikes the mica support members which alone prevent further damage to the device.

In order to avoid such excess amplitude of vibration, the present invention is provided with amplitude control anode 17 which controls the amplitude of vibration by causing the gain of the tube to decrease as the amplitude of the vibratory reed 16 increases. Amplitude control anode 17 is preferably positioned behind emitting member 12 in order not to interfere with the functions of the other members within envelope 11.

Amplitude control anode 17 is the anode for an automatic amplitude control circuit (hereinafter more fully described) which controls the grid bias of the tube (the value of the potential on reed 16) and so controls the amplitude of the vibration of reed 16.

Vibratory reed or rod 16 is preferably made of fused quartz which has a low coefficient of internal viscosity so that it vibrates readily and for a long period once it has been set into motion. Vibratory member 16 may, if desired, be supported at its upper end, or may be a string element supported at both ends and vibratable in the middle.

It has been found in practice that fused quartz reeds having a perfectly circular cross section are difficult to obtain due to difficulties of manufacture. Accordingly, fused quartz reeds have a non-circular cross section and vibrate at different frequencies in different planes. Such reeds vibrate at highest frequency in the plane of greatest stiffness of the reed, and vibrate at lowest frequency in the plane of minimum reed stiffness. This frequency difference according to the plane of vibration is undesirable, since it causes the plane of vibration of the reed to oscillate and, in a device having a good memory, gives a spurious result. The elimination of this undesirable difference of vibration frequency is an object of the present invention, and means are provided to compensate for any lack of perfect circularity of reed 16 so as to cause the frequency of vibration in the principal planes of vibration to be substantially identical.

In order to overcome this problem of the mechanically preferred plane of vibration, there is provided a vibratory reed 16 having a shaft 31, which is (unavoidably, not deliberately) non-circular (shown greatly exaggerated in the drawings), and which is mounted in a comparatively larger intermediate base 32. Base 32 is in turn mounted in a massive base 33. Shaft 31 and base 32 are preferably made of the same material, while base 33 is a graded seal (formed of layers of glass of different composition) which is designed to effectively mount quartz to glass. To compensate for the non-circulatory cross section of shaft 31 and thereby eliminate any mechanically preferred plane of vibration, intermediate base 32 is deformed by abrasion in any known manner, such as by ultrasonics. An abrasion of proper depth located in the plane of greatest stiffness of shaft 31 makes the necessary compensation to eliminate any mechanically preferred plane of vibration. Compensation could be made by abrading shaft 31 itself, but shaft 31 is very thin and the heavier base 32 is easier worked.

The free end of shaft 31 may be provided with an enlarged portion 34 which provides additional mass, if desired.

Excessive amplitude of vibration has in the past caused the breakdown of previously proposed heading-sensing devices by cracking open gold film 27 which covers vibratory reed 16. Gold film 27 forms an electrical connection between vibratory reed 16 and its terminal pin 25, and the cracking occurred at the base of reed 16 due to excessive amplitude of vibration of reed 16.

Figures 3, 4, 5, 6:
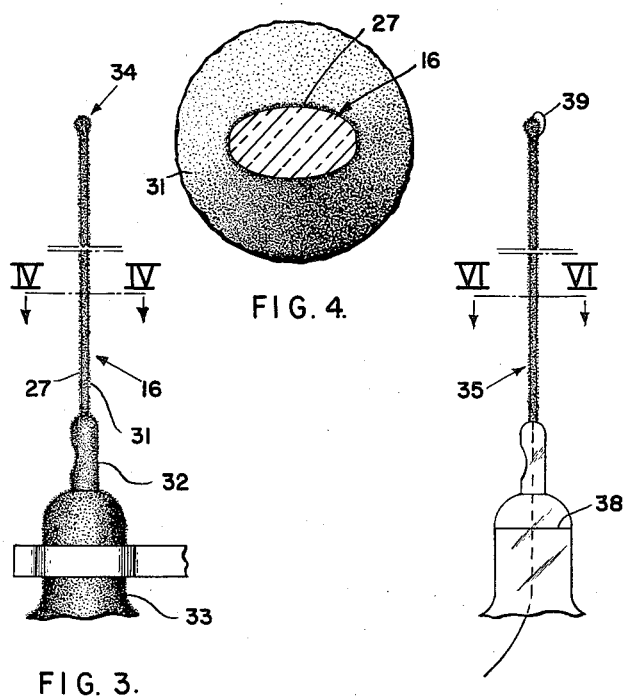
FIG. 3 is a view in elevation of a vibrating reed which forms an element of this invention.
FIG. 4 is a view in cross section of the vibrating reed taken as indicated by the lines and arrows IV—IV which appear in FIG. 3 with the lack of roundness of the reed greatly exaggerated.
FIG. 5 is a view in elevation of a modification of the vibrating reed which forms an element of this invention.
FIG. 6 is a view in cross section of the vibrating reed of FIG. 5 taken as indicated by the lines and arrows VI—VI which appear in FIG. 5 with the lack of roundness of the reed greatly exaggerated.

Referring to FIGS. 5–6, there is shown another embodiment which includes a vibratory reed 35 which is tubular in shape and which has its inside surface coated with a layer 36 of gold or other electrically conducting material. A layer 37 of gold also extends over the outside surface of reed 35 and performs the same functions as gold film 27 performs on vibratory reed 16. However, layer 36 is less likely to crack and thereby open the electrical circuit. A vacuum seal 38 is provided at the bottom of reed 35 and an electrical connection 39 is provided at the top to connect the inside gold layer 36 to the outside gold layer 37.

The operation of the electronic heading-sensing device of this invention will be described in connection with FIG. 7, with identifying letters being applied to the illustrated elements, and with corresponding numbers of previous figures appearing in parentheses.

Figure 7:
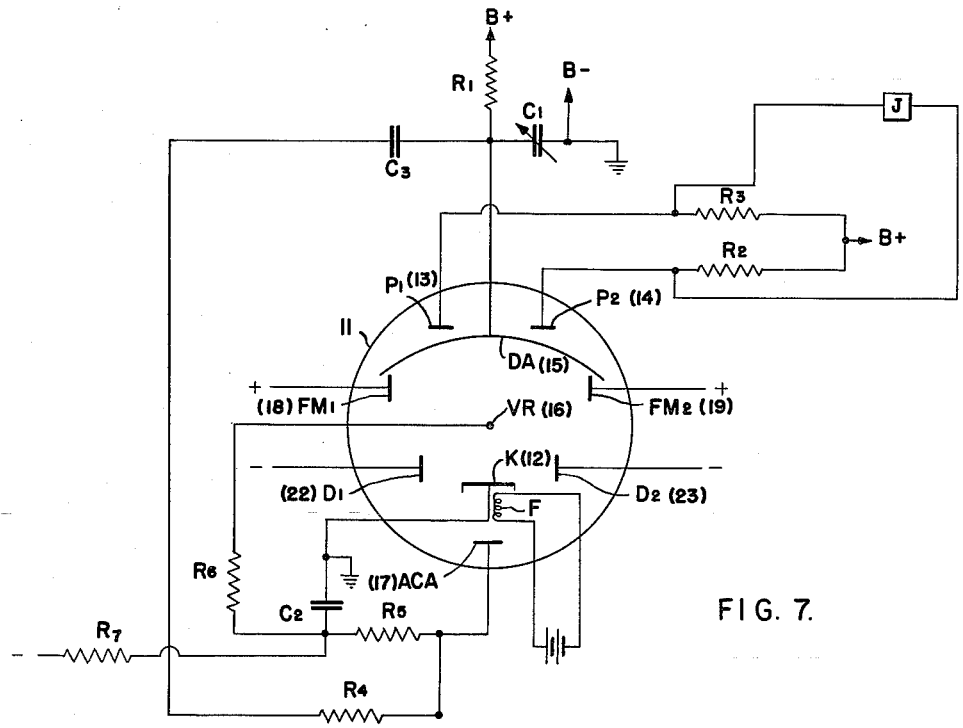
FIG. 7 is a diagrammatic view which illustrates an application of the heading-sensing device of this invention and uses identifying letters for labelling the elements in addition to the reference numerals.

In FIG. 7 there is provided an electronic heading-sensing device including an envelope 11, vibrating reed VR (16 in FIG. 1), a cathode K (12) which is heated by a filament F, a drive anode DA (15), amplitude control anode ACA (17), beam directing members D1, D2 (22, 23), beam forming members FM1, FM2 (18, 19), and signal collecting plates P1, P2 (13, 14). Also provided are resistors R1–R7, a B battery, a C battery and capacitors C1–C3. The voltages appearing on R2, R3 are a differential A.-C. signal of the same frequency of vibration as the reed VR. The signal is used by conventional circuits which are represented by block J, for example, a magnetic amplifier.

The reed VR is connected so that it is negatively polarized with respect to cathode K so that there is an electrostatic attraction between the negative reed VR and the positive drive anode DA. Consequently, the reed VR vibrates toward and away from the plate DA in the following manner. As negative reed VR moves toward plate DA, reed VR has less effect in repelling the negative electrons admitted by the cathode K. Accordingly the plate current increases so that there is a corresponding increase in the voltage drop across resistor R1. This causes the positive potential on drive anode DA to decrease, resulting in a decrease in the force attracting reed VR toward drive anode DA. The inherent restoring force of reed VR thereupon causes it to deflect away from drive anode DA and carries it toward cathode K.

As the negative reed VR approaches the cathode K, it has more and more control over the electron flow so that the plate current decreases and the drive anode DA voltage increases to again attract reed VR.

Such vibratory movement of reed VR would continue to increase until reed VR struck something, since, due to the low viscosity of reed VR, its vibration would not attain a position of equilibrium. It is well known that in any vibratory device, more energy is needed to start the vibration, than to thereafter continue such vibration. Therefore, in order to insure that reed VR starts to vibrate and thereafter continues to do so in a stable and uniform manner, a very high starting drive potential is provided by the circuitry connected to drive anode DA to start vibration, and a feed back circuit (terminating in amplitude control anode ACA and back through resistor R6 to vibrating reed VR) is provided which changes the bias of vibrating reed VR and stabilizes its amplitude of vibration after it has started vibrating to continue the vibrating in a stable and uniform manner.

Amplitude control anode ACA is part of an amplitude control circuit which includes resistors R4–R7 and capacitors C2, C3.

Power is fed back from drive anode DA to amplitude control anode ADA through resistor R4 to control the maximum amplitude that reed VR is to be permitted. Resistor R5 and capacitor C2 control the time after the start of reed vibrations at which the amplitude control circuit starts to effect the amplitude of those vibrations. Resistors R6 and R7 form a bridge network to permit the variable bias (from R5, C2, and R6) and the fixed bias (from R7) to control the potential of vibrating reed VR.

The alternating voltage developed at drive anode DA by the vibrating reed VR causes capacitor C1 to be charged. Capacitor C1 retains its charge for a period based upon the time constant of C1 and resistor R1, and a positive potential is maintained on drive anode DA to attract the reed VR. Consequently, as the voltage on drive anode DA lags because of the action of capacitor C1, each time the reed VR approaches the drive anode DA, the reed VR continues its vibration at its natural frequency without loss of amplitude.

With the reed VR oscillating, a voltage is developed across the resistor R1. When the device as shown in FIG. 1 is rotated about the axis of vibrating reed VR, reed VR remains vibrating in the same plane of vibration as before but the electron collecting members 13, 14 are displaced with respect to that plane of vibration.

Accordingly, vibrating reed VR approaches one of the collecting plates FM1, FM2 (FIG. 7) more than the other and hence the signal voltage developed across resistors R2 and R3 increases and decreases depending upon the direction of rotation of the device.

The signal resistors R2 and R3 are connected through conventional circuits (represented by the block J) so that the differential A.-C. voltage developed across resistors R2 and R3 is utilized in a conventional manner. The resulting differential A.-C. signal voltage appears at the output of the block J and is fed to other devices, such as a servo-motor, for correcting the attitude of the plane.

Figure 8:
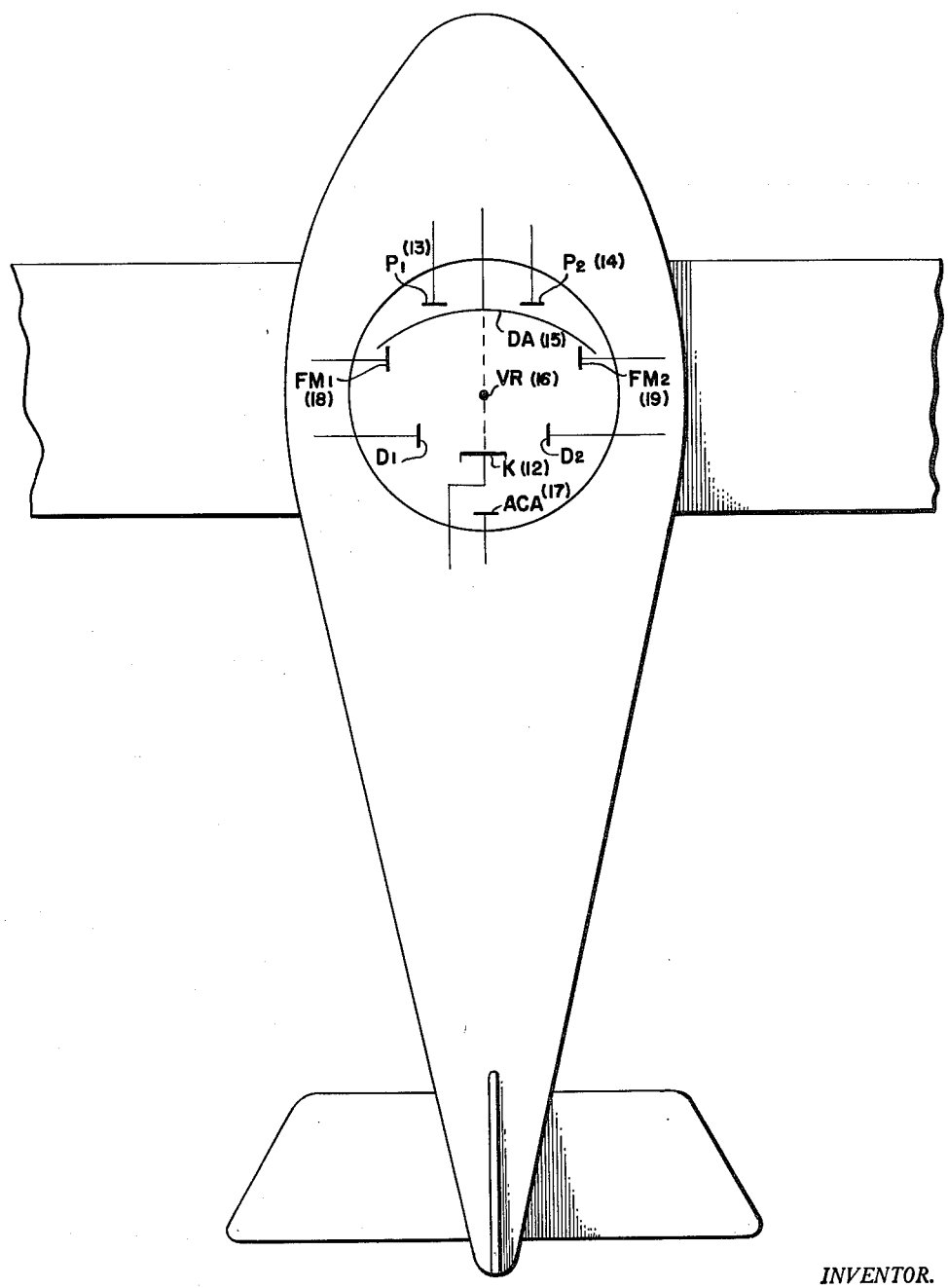
FIG. 8 is a diagrammatic view which illustrates the heading-sensing device of this invention installed in an aircraft.

The sensing device of this invention has many applications. One such application is shown in FIG. 8 wherein the electronic heading-sensing device is installed in an aircraft.

The heading-sensing device of this invention may be incorporated into systems to show rate of turn, pitch, or roll of such craft, or may be incorporated in systems in which the differential signal drives a servomotor which continuously repositions the sensing device to restore it to its original position, the amount and direction of such repositioning drive being a measure of the original angular deviation.

It is to be understood that the form of the invention herewith shown and described is only one embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. The term "value," as used herein to refer to any of the electrodes, means geometrical position, size, and electrical bias combined.

The claimed invention:

1. An electronic heading-sensing device comprising an evacuated envelope having positioned therein an electron emitting member, at least two electron collecting members adapted to collect electrons when positively polarized, a drive member opposed to said electron emitting member, a vibratory element positioned between said emitting and collecting members and between said emitting and drive members, said vibratory member having a portion thereof adapted to be negatively polarized and in the path of said electron emitting member, and electronic amplitude control means for automatically controlling the maximum amplitude of vibration of said vibratory element.

2. The electronic heading-sensing device defined in claim 1, wherein said amplitude control means includes a polarized amplitude control anode mounted within said envelope and connected in circuit with said vibratory element, said emitting member being positioned intermediate said amplitude control anode and said vibratory member.

3. The electronic heading-sensing device defined in claim 1, wherein a pair of positively polarized electron-beam forming members are provided substantially symmetrically arranged on each side of a line between said vibratory element and the center of said drive member, whereby to provide a controllable electronic field between said emitting and collecting members so that said vibratory element has a controllable and adjustable electronic preferred plane of vibration, whereby the erection rate of the vibratory element, in seeking said electronic preferred plane of vibration, is controlled by increasing and decreasing the value of said beam forming electrodes, the lower the value, the slower the erection rate and the better the sensitivity of the instrument as a rate device, and the better its memory as a position device.

4. The electronic heading-sensing device defined in claim 1, wherein are provided a curved surface for said drive member with all points thereon substantially equidistant from said vibratory element to eliminate any electronic preferred plane of vibration caused by said drive member, a pair of negatively polarized electron-beam directing members substantially symmetrically arranged on each side of a line between the center of said beam emitting member and said vibratory element, and a pair of polarized electron-beam forming members substantially symmetrically arranged on each side of a line between said vibratory element and the center of said drive member, whereby to provide a controllable electronic field between said emitting and collecting members so that said vibratory element has a controllable electronic preferred plane of vibration, whereby the erection rate of the vibratory element, in seeking said electronic preferred plane of vibration, is controlled to increase the sensitivity and lengthen the memory of the device.

5. The electronic heading-sensing device defined in claim 1, wherein said vibratory element is a quartz reed having a substantially circular shaft, and wherein compensating means for any lack of circularity of said shaft are provided so as to cause the frequency of vibration in the principal planes of vibration to be substantially identical.

6. The electronic heading-sensing device defined in claim 5, wherein said compensating means is a base member which supports said shaft, said base member being deformed by abrasion so as to make the frequency of vibration of the principal planes of vibration of the shaft substantially equal to eliminate any preferred plane of vibration on the part of the shaft.

7. The electronic heading-sensing device defined in claim 1, wherein said vibratory element is a quartz reed which is tubular in shape and wherein electrical conducting material lies along the inside surface of said tubular reed to provide an electrical connection to a pin extending from the base of said envelope, whereby the strains in said electrical conducting material due to vibration are reduced.

8. The electronic heading-sensing device defined in claim 1, wherein said drive member is formed with a curved surface and is positioned between said electron collecting members and the other members in the envelope to effectively screen said collecting members electrostatically.

9. An electronic heading-sensing device comprising an evacuated envelope having positioned therein an electron emitting member, two electron collecting members which are polarized in a positive sense, a drive member which is opposed to said emitting member, a vibratory reed which is polarized in the negative sense and which is in the path of electrons between the emitting member and the collecting members, and a self-biasing amplitude control anode for controlling the maximum amplitude of vibration of said vibratory reed.

10. An electron heading-sensing device comprising an evacuated envelope having positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, and means for automatically controlling the maximum amplitude of vibration of said vibratory reed.

11. The electron heading-sensing device defined in claim 10, wherein said means for automatically controlling the maximum amplitude of vibration of said vibratory reed is an anode positioned in said envelope and connected into a self-biasing electronic circuit.

12. An electron heading-sensing device comprising an evacuated envelope having positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, compensating means for causing the frequency of vibration of said reed in its principal planes of vibration to be substantially identical, and means for automatically controlling the maximum amplitude of vibration of said vibratory reed.

13. An electron heading-sensing device comprising an evacuated envelope having positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, means for creating an electronically preferred plane of vibration for said reed, and means for automatically controlling the maximum amplitude of vibration of said vibratory reed.

14. An electron heading-sensing device comprising an evacuated envelope having positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, means for controlling the erection rate of said reed, and means for automatically controlling the maximum amplitude of vibration of said vibratory reed.

15. An electron heading-sensing device comprising an evacuated envelope having positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, means for adjusting the intensity of the path of electrons between said emitting means and said collecting means, and means for automatically controlling the maximum amplitude of vibration of said vibratory reed.

16. An electron heading-sensing device comprising an evacuated envelope haivng positioned therein means for emitting electrons, a pair of means for collecting said electrons, a vibratory reed positioned in the path of electrons between said electron emitting means and said electron collecting means, means positioned between said vibratory reed and said collecting means for driving said reed to vibrate and for electrostatically shielding said reed from said electron collecting means, means for adjusting the lateral position of the path of electrons between said emitting means and said collecting means, and means for automatically controlling the maximum amplitude of vibration of said vibratory reed.

17. A device for ascertaining the deviation of a craft from a predetermined direction, comprising means for emitting a stream of electrons at an emitting zone, means for collecting said stream of electrons at a collecting zone, means for vibrating a reed in the path of said stream of electrons between the emitting zone and the collecting zone, means for electrostatically shielding said read from said electron collecting zone, and means for automatically controlling the maximum amplitude of vibration of said reed.

18. A device for ascertaining the deviation of a craft from a predetermined direction, comprising means for emitting a stream of electrons at an emitting zone, means for collecting said stream of electrons at a collecting zone, means for vibrating a reed in the path of said stream of electrons between the emitting zone and the collecting zone, means for electrostatically shielding said reed from said electron collecting zone, means for creating an electronically preferred plane of vibration for said reed, and means for automatically controlling the maximum amplitude of vibration of said reed.

19. A device for ascertaining the deviation of a craft from a predetermined direction, comprising means for emitting a stream of electrons at an emitting zone, means for collecting said stream of electrons at a collecting zone, means for vibrating a reed in the path of said stream of electrons between the emitting zone and the collecting zone, means for electrostatically shielding said reed from said electron collecting zone, means for controlling the erection rate of said reed, and means for automatically controlling the maximum amplitude of vibration of said reed.

20. A device for ascertaining the deviation of a craft from a predetermined direction, comprising means for emitting a stream of electrons at an emitting zone, means for collecting said stream of electrons at a collecting zone, means for vibrating a reed in the path of said stream of electrons between the emitting zone and the collecting zone, means for electrostatically shielding said reed from said electron collecting zone, means for adjusting the intensity of the path of electrons between said emitting zone and said collecting zone, and means for automatically controlling the maximum amplitude of vibration of said reed.

21. A device for ascertaining the deviation of a craft from a predetermined direction, comprising means for emitting a stream of electrons at an emitting zone, means for collecting said stream of electrons at a collecting zone, means for vibrating a reed in the path of said stream of electrons between the emitting zone and the collecting zone, means for electrostatically shielding said reed from said electron collecting zone, means for adjusting the lateral position of said stream of electrons flowing between said emitting zone and said collecting zone, and means for automatically controlling the maximum amplitude of vibration of said reed.

References Cited in the file of this patent

UNITED STATES PATENTS

| | | |
|---|---|---|
| 2,837,675 | Iversen | June 3, 1958 |
| 2,839,701 | Bourns | June 17, 1958 |
| 2,895,048 | Jacobsen | July 14, 1959 |